P. F. APFEL.
ELECTRIC HEATER.
APPLICATION FILED APR. 3, 1917.
1,260,252.
Patented Mar. 19, 1918.
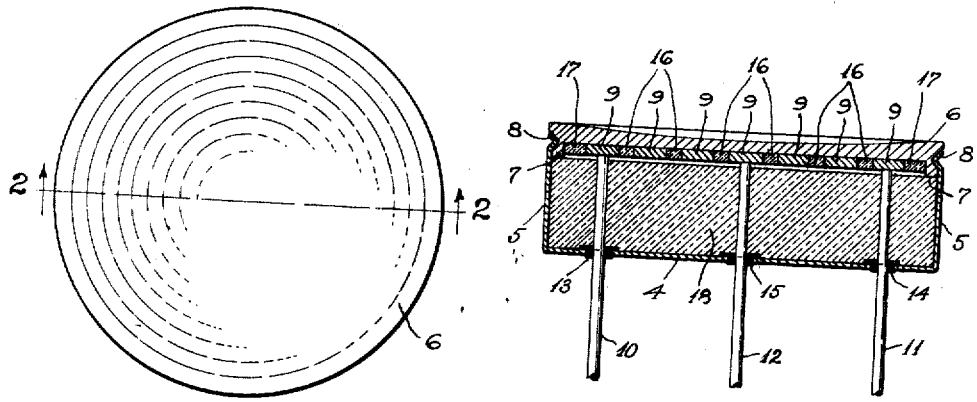
FIG. 1
FIG. 2
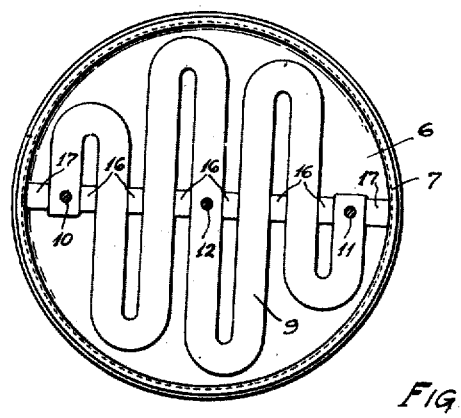
FIG. 3
Inventor
Philip F. Apfel
By C. D. Haskins
Attorney form of inclosing case.

UNITED STATES PATENT OFFICE.

PHILIP F. APFEL, OF SEATTLE, WASHINGTON.

ELECTRIC HEATER.

1,260,252.
Specification of Letters Patent. Patented Mar. 19, 1918.
Application filed April 3, 1917. Serial No. 159,536.

*To all whom it may concern:*

Be it known that I, PHILIP F. APFEL, a citizen of the United States, residing at Seattle, in the county of King and State of Washington, have invented a certain new and useful Improvement in Electric Heaters, of which the following is a specification.

My invention relates to electric heaters of that class which is employed for heating coffee pots, stew pans and like cooking vessels, and the object of my invention is to provide an electric heater which shall embody an inclosing case whose top wall is made of molded refractory earthy material and whose top surface shall be slightly concave to insure a contact between it and the outer edge portion of the bottom of a vessel placed thereon, and which inclosing case shall contain an electric heating element and a mass of electric insulating material that is a nonconductor of heat, so relatively disposed that nearly all of the heat generated by said heating element may be efficiently utilized through the medium of said top wall.

I accomplish this object by devices illustrated in the accompanying drawings, wherein—

Figure 1 is a plan view of one form of electric heater embodying my invention;

Fig. 2 is a view of the same in vertical mid-section on broken line 2, 2 of Fig. 1; and Fig. 3 is a view of the under side of the top wall of the same with its heating element attached thereto.

Referring to the drawings, throughout which like reference numerals indicate like parts, 4 is a circular bottom wall and 5 is the vertical cylindrical wall of an inclosing case, which walls are preferably made of sheet metal.

A circular top wall 6, is made of molded refractory earthy material and provided with an externally grooved integral flange 7 that projects downwardly from its side edge portion into the top portion of the inclosing case where it is securely fastened by the top edge portion 8 of the vertical cylindrical wall 5 which portion 8 is turned inwardly to fit tightly into the groove of said flange 7, as indicated in Fig. 2.

Disposed in contact with the surface of the inner side of the circular top wall 6 is the top surface of an electric heating element 9, of well known form, to each of the end portions and to the central portion of which is connected one end of an electric conductor, as conductors 10, 11 and 12, respectively, which conductors extend vertically downward to and through bushings 13, 14 and 15, respectively (that are fixed in holes which extend through the bottom wall 4 of the inclosing case) and thence to connect with a switch-controlled source of electricity not shown.

The conductors 10, 11 and 12, being fitted tightly in the bushings 13, 14 and 15, serve to maintain the heating element 9 in its fixed position against the under side of the top wall 6.

In order more rigidly to maintain adjacent parallel portions of the heating element 9 in their relative positions, there are pieces 16 of refractory insulating material forcibly pressed into the spaces between adjacent ones of said parallel portions, and like pieces 17 are forced into the spaces between the internal surface of the flange 7 and the end portions of said heating element 9, as shown more clearly in Fig. 3.

Disposed within the inclosing case, between its bottom wall 4 and the under side of the heating element 9, is a mass of refractory material 18, as, for instance, a mass of diatomaceous material, which I have found best to serve both as an insulator of heat and an insulator of electricity, and which material 18, thus disposed, makes it possible for all of the heat of the heating element 9 to be available for useful purposes by heating only the top wall 6.

The top surface of the top wall 6 is slightly concave, as shown in Fig. 2, whereby the outer edge portion only of the bottom surface of a cooking vessel placed thereon may make actual contact therewith, thus to confine a stratum of heated air within the space between the bottom surface of said cooking vessel and the concave surface of said top wall 6.

While I have shown the inclosing case of an electric heater embodying my invention as being of a circular form, it is obvious that such inclosing case may be made of different form, as square, or oblong, in which case the form of the heating element may be changed better to adapt it to such different form of inclosing case.

To utilize my electric heater when made in the form shown in the drawings, it is disposed on a suitable support and the electrical conductors 10, 11 and 12 are connected with the proper terminals of switching apparatus connected with a source of electricity in a well known manner, whereby, as may be desired at different times, such switching apparatus may be manipulated to cause the top plate 6 to be heated to a desired one of different temperatures. For instance, the source of electricity being of a constant electromotive force, if the switching apparatus be operated to cause current to flow throughout the whole length of the heating element 9 between conductors 10 and 11, then such heating element 9 will be heated to its minimum temperature; or if current is caused to flow at the same time between the conductor 12 and both of the conductors 10 and 11, then such heating element 9 will be heated to its maximum temperature; or if current be caused to flow between the conductor 12 only to either one or the other of the conductors 10 and 11, then said heating element 9 will be heated to a temperature lower than its maximum and higher than its minimum temperature.

What I claim is:

An electric heater of the class described embodying an inclosing case, an inwardly directed flange carried thereby, a plate of molded earthy material supported by said flange, an electrical heating element including adjacently positioned members supported in intimate contact with the inner surface of said plate, non-conducting spacing elements positioned between the adjacent members, means for conducting electricity to said heating element fixed to the bottom of the casing and holding the heating element in contact with the earthy material, and a mass of non-heat conducting refractory material disposed within said inclosing case.

In witness whereof, I hereunto subscribe my name this 28th day of March, A. D. 1917.

PHILIP F. APFEL.